United States Patent
Kassis et al.

(10) Patent No.: US 12,494,920 B2
(45) Date of Patent: Dec. 9, 2025

(54) SYSTEMS AND METHODS FOR USING DIGITAL IDENTITY FRAMEWORKS AND INFRASTRUCTURE TO ACCESS AND INTERACT WITH DECENTRALIZED APPLICATIONS

(71) Applicant: JPMORGAN CHASE BANK, N.A., New York, NY (US)

(72) Inventors: George Kassis, London (GB); Kirsten Jones, Southbourne (GB); Tyrone D Lobban, Loughton (GB); Nikhil Sharma, Kennedy Town (HK); Keerthi Moudgal, Brooklyn, NY (US); Stoyan H Djourov, Luxembourg (LU); Angela Pratt, Manhattan, NY (US); Jitendra Bhurat, Princeton, NY (US); Manmeet Ahluwalia, Tampa, FL (US); Vishakh ., New York, NY (US); Bhaskar Kishore, Greater Noida (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 285 days.

(21) Appl. No.: 18/342,450

(22) Filed: Jun. 27, 2023

(65) Prior Publication Data
US 2023/0421386 A1  Dec. 28, 2023

Related U.S. Application Data

(60) Provisional application No. 63/373,814, filed on Aug. 29, 2022, provisional application No. 63/357,511, (Continued)

(51) Int. Cl.
*H04L 29/06* (2006.01)
*H04L 9/00* (2022.01)
(Continued)

(52) U.S. Cl.
CPC .......... *H04L 9/3247* (2013.01); *H04L 9/0819* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 11,270,245 B2 * | 3/2022 | Dasari | H04L 9/0637 |
| 11,741,216 B1 * | 8/2023 | Dods | H04L 9/0891 |
| | | | 713/189 |

(Continued)

FOREIGN PATENT DOCUMENTS

WO  2019191216  10/2019

OTHER PUBLICATIONS

International Search Report and Written Opinion of the International Searching Authority, dated Aug. 31, 2023, from corresponding International Application No. PCT/US2023/069180.

(Continued)

*Primary Examiner* — Jeffery L Williams
(74) *Attorney, Agent, or Firm* — GREENBERG TRAURIG LLP

(57) ABSTRACT

Systems and methods for using digital identity frameworks to access and interact with decentralized applications are disclosed. A method may include a proxy smart contract: receiving a trade from an authorized trader and an on-chain format of a verifiable credential, wherein the on-chain format of the verifiable credential comprises a flattened array of an authorized trader verifiable credential, a trusted entity verifiable credential, and root issuer verifiable credential; verifying, using a verifier smart contract, the on-chain format of the verifiable credential, wherein the verifier smart contract queries a digital identifier registry to verify that an authorized trader digital identifier, a trusted entity (Continued)

digital identifier, and a root issuer digital identifier associated with the root issuer verifiable credential are active; and in response to the authorized trader digital identifier, the trusted entity digital identifier, and root issuer digital identifier being active, executing, with a decentralized finance smart contract, the trade.

18 Claims, 11 Drawing Sheets

Related U.S. Application Data filed on Jun. 30, 2022, provisional application No. 63/367,115, filed on Jun. 27, 2022.

(51) Int. Cl.
*H04L 9/08* (2006.01)
*H04L 9/32* (2006.01)

(56) References Cited

U.S. PATENT DOCUMENTS

| | | | |
|---|---|---|---|
| 12,052,246 | B2 * | 7/2024 | Khalil ............... H04L 63/06 |
| 2022/0138769 | A1 * | 5/2022 | Olson ............... H04L 9/50 705/37 |
| 2022/0311618 | A1 * | 9/2022 | Johnson ............ H04L 9/3236 |
| 2022/0385476 | A1 * | 12/2022 | Murdoch .......... H04L 63/126 |
| 2023/0188349 | A1 * | 6/2023 | Moy ................. H04L 9/50 726/9 |
| 2023/0351353 | A1 * | 11/2023 | Saraf .............. G06Q 30/0613 |
| 2023/0421386 | A1 * | 12/2023 | Kassis ............. G06Q 20/065 |
| 2024/0346473 | A1 * | 10/2024 | Agbamu ........... G06Q 20/065 |
| 2025/0182118 | A1 * | 6/2025 | Burchard ......... H04L 63/0407 |
| 2025/0225271 | A1 * | 7/2025 | Dods ............... H04L 63/0838 |

OTHER PUBLICATIONS

ETSI; "ESI Application of Distributed Ledger Technology to Signatures and Trust Services", European Telecommunications Standards Institute, Feb. 26, 2021.

* cited by examiner

Off Chain VC Format:

```
interface VC {
  "@context": string,
  id: string,
  type: string[],
  issuer: {
    id: string,
    vc: VC | undefined
  },
  expirationDate: number,
  issuanceDate: number,
  credentialSubject: {
    id: string,
    ...
  },
  proof: OnChainProof
}

//New Proof type
interface OnChainProof {
  ...
  signature: string,
}
```

On Chain VC Format:

```
struct VC {
  bytes32 id;
  CredentialSubject {
    bytes32 id;
    bytes data
  }
  bytes32 issuerDid;
  uint128 expirationDate;
  uint128 issuanceDate;
  bytes types;
  OnchainProof proof {
    ...
    bytes32 proofValue;
  }
}
```

Conversion Algorithm fn `convertFormat` -- Off Chain to On Chain

1. The DiD namespace prefix is defined using the chosen DiD method.
2. Any hashing defined below is then defined as Keccack256( namespace_prefix, getEthAddress(input_did) ).
3. The off chain field VC.id is hashed and mapped to the on chain field VC.id.
4. The off chain field VC.credentialSubject.id is hashed and mapped to the on chain field VC.subjectDID.
5. The off chain field VC.issuer.id is hashed and mapped to the on chain field VC.issuerDiD.
6. The off chain field VC.expirationDate is mapped directly to the on chain field VC.expirationDate.
7. The off chain array VC.type is mapped at position index = x to the on chain filed VC.types. This limitation will be removed in a later iteration.
8. The off chain field VC.proof.signature is mapped directly to the on chain field VC.proof. Set to empty if no VC.proof.signature is present.

FIGURE 3

SYSTEMS AND METHODS FOR USING DIGITAL IDENTITY FRAMEWORKS AND INFRASTRUCTURE TO ACCESS AND INTERACT WITH DECENTRALIZED APPLICATIONS

RELATED APPLICATIONS

This application claims priority to U.S. Provisional Patent Application Ser. No. 63/367,115, filed Jun. 27, 2022, U.S. Provisional Patent Application Ser. No. 63/357,511, filed Jun. 30, 2022, and U.S. Provisional Patent Application Ser. No. 63/373,814, filed Aug. 29, 2022, the disclosures of each of which is hereby incorporated, by reference, in its entirety.

BACKGROUND OF THE INVENTION

1. Field of the Invention

Embodiments relate to systems and methods for using digital identity frameworks and infrastructure to access and interact with decentralized applications.

2. Description of the Related Art

In general, institutions, such as financial institutions or banks, are unable to partake in Web3/Decentralized Finance (DeFi) applications or smart contracts with tokenized real-world assets in a compliant/permissioned manner due to an inability to trust the other participants in DeFi smart contracts.

SUMMARY OF THE INVENTION

Systems and methods for using digital identity frameworks and infrastructure to access and interact with decentralized applications are disclosed. In one embodiment, a method for using digital identity frameworks and infrastructure to access and interact with decentralized applications may include: (1) receiving, by a proxy smart contract, a trade from an authorized trader and an on-chain format of a verifiable credential, wherein the on-chain format of the verifiable credential comprises a flattened array of an authorized trader verifiable credential, a trusted entity verifiable credential, and root issuer verifiable credential; (2) verifying, by the proxy smart contract and using a verifier smart contract, the on-chain format of the verifiable credential, wherein the verifier smart contract queries a digital identifier registry to verify that an authorized trader digital identifier associated with the authorized trader verifiable credential, a trusted entity digital identifier associated with the trusted entity verifiable credential, and a root issuer digital identifier associated with the root issuer verifiable credential are active; and (3) in response to the authorized trader digital identifier, the trusted entity digital identifier, and root issuer digital identifier being active, executing, by the proxy smart contract and with a decentralized finance smart contract, the trade from the authorized trader.

In one embodiment, the authorized trader digital identifier, the trusted entity digital identifier, and root issuer digital identifier are registered in the digital identifier registry.

In one embodiment, the authorized trader verifiable credential, the trusted entity verifiable credential, and the root issuer verifiable credential are nested in an off-chain format of the verifiable credential.

In one embodiment, a wallet for the authorized trader converts the off-chain format of the verifiable credential into the on-chain format of the verifiable credential.

In one embodiment, the trusted entity verifiable credential is issued by a root issuer.

In one embodiment, the authorized trader verifiable credential is issued by a trusted entity issuer.

In one embodiment, the method may also include receiving, by the proxy smart contract, verification that the trade complies with one or more rules.

In one embodiment, the verifier smart contract is configured to confirm that a trusted entity and a root issuer are known.

In one embodiment, the verifier smart contract is configured to verify a digital signature for a proof using an Ethereum address private key for a signer.

According to another embodiment, a method of preparing an on-chain verifiable credential may include: (1) claiming, by an authorized trader user interface, an authorized trader verifiable credential from a trusted entity, wherein the authorized trader verifiable credential comprises a trusted entity verifiable credential for the trusted entity and a root issuer verifiable credential for a root issuer, wherein the root issuer verifiable credential and the trusted entity verifiable credential are nested within the authorized trader verifiable credential; (2) registering, by the authorized trader user interface, an authorized trader digital identifier with a digital identifier registry; (3) converting, by the authorized trader user interface, the authorized trader verifiable credential from an off-chain format to an on-chain format, wherein the on-chain format comprises a flattened array of the authorized trader verifiable credential, the trusted entity verifiable credential, and the root issuer verifiable credential; and (4) submitting, by the authorized trader user interface, a trade and the on-chain format of the authorized trader verifiable credential to a proxy smart contract. The proxy smart contract is configured to forward the on-chain format of the authorized trader verifiable credential to a verifier smart contract, and the verifier smart contract is configured to query a digital identifier registry to verify that an authorized trader digital identifier associated with the authorized trader verifiable credential, a trusted entity digital identifier associated with the trusted entity verifiable credential, and a root issuer digital identifier associated with the root issuer verifiable credential are active, and in response to the authorized trader digital identifier, the trusted entity digital identifier, and root issuer digital identifier being active, execute the trade with a decentralized finance smart contract.

In one embodiment, the trusted entity verifiable credential is issued by a root issuer.

In one embodiment, the authorized trader verifiable credential is issued by a trusted entity issuer.

In one embodiment, the authorized trader digital identifier, the trusted entity digital identifier, and root issuer digital identifier are registered in the digital identifier registry.

According to another embodiment, a system may include: an authorized trader interface for an authorized trader; a trusted entity interface for a trusted entity; a root issuer interface for a root issuer; a proxy smart contract in communication with the authorized trader interface and a decentralized finance smart contract; a verifier smart contract in communication with the proxy smart contract; a digital identifier registry; and a decentralized finance smart contract. The root issuer interface registers a root issuer digital identifier with the digital identifier registry and issues a trusted entity verifiable credential to the trusted entity, wherein the trusted entity verifiable credential comprises a root issuer verifiable credential. The trusted entity claims the trusted entity verifiable credential and registers a trusted digital identifier with the digital identifier registry and issues an authorized trader verifiable credential to the authorized trader, wherein the authorized trader verifiable credential comprises the trusted entity verifiable credential and the root issuer verifiable credential, wherein the trusted entity verifiable credential and the root issuer verifiable credential are nested in the authorized trader verifiable credential. The authorized trader claims the authorized trader verifiable credential and registers an authorized trader digital identifier with the digital identifier registry, converts the authorized trader verifiable credential from an off-chain format to an on-chain format, wherein the on-chain format comprises a flattened array of the authorized trader verifiable credential, the trusted entity verifiable credential, and the root issuer verifiable credential, and communicates a trade and the on-chain format of the authorized trader verifiable credential to the proxy smart contract. The proxy smart contract communicates the trade and the on-chain format of the authorized trader verifiable credential to the verifier smart contract. The verifier smart contract queries the digital identifier registry to verify that an authorized trader digital identifier associated with the authorized trader verifiable credential, a trusted entity digital identifier associated with the trusted entity verifiable credential, and a root issuer digital identifier associated with the root issuer verifiable credential are active. In response to the authorized trader digital identifier, the trusted entity digital identifier, and root issuer digital identifier being active, the proxy smart contract executes the trade from the authorized trader with the decentralized finance smart contract.

In one embodiment, the proxy smart contract receives verification that the trade complies with one or more rules.

In one embodiment, the verifier smart contract confirms that the trusted entity and the root issuer are known.

In one embodiment, the verifier smart contract verifies a digital signature for a proof using an Ethereum address private key for a signer.

In one embodiment, the proxy smart contract receives trade information for the trade.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

FIG. 3 depicts exemplary details for converting a verifiable credential from an off-chain format to an on-chain format according to an embodiment;

DETAILED DESCRIPTION OF PREFERRED EMBODIMENTS

Embodiments disclosed herein relate to systems and methods for using digital identity frameworks and infrastructure to access and interact with decentralized applications, such as decentralized finance applications.

Embodiments may enable institutions to claim and issue Verifiable Identity Credentials in order to interact with DeFi smart contracts. For example, root anchors, such as government-based entities, may issue entity level verifiable credentials ("VCs") to trust anchors (e.g., banks, FinTechs, and other institutions). The trust anchors may issue internal and client verifiable identity credentials (e.g., an authorized trader credential that attests that the authorized trader is acting on behalf of that entity, and what specific entitlements they have relating to that credential). The identity credentials may further impose limits on trading.

The institutional authorized traders and other stakeholders may use their credentials to interact with their institution's proxy smart contracts to prove their identity and entitlements and then interact and trade in DeFi smart contracts. The proxy smart contracts may be specific to, and owned by the institution.

Participants may need to agree to the credential standards and the relevant data points required by the proxy smart contract. Upon the proxy smart contract verifying the credentials, the authorized trader may then instruct the movement of tokenized real-world assets and other assets to and from the proxy smart contract to any a/multiple DeFi smart contracts.

Embodiments may provide institutional access to DeFi smart contracts for tokenized real-world assets. Embodiments may provide privacy, protocol governance, root anchor audit/checks, and may leverage existing know your customer (KYC) processes. Embodiments may provide scalability with more stakeholder roles (e.g., risk manager, operations, etc.); may be scalable across other DeFi applications, and may require minimal DeFi smart contract changes.

Figure 1:
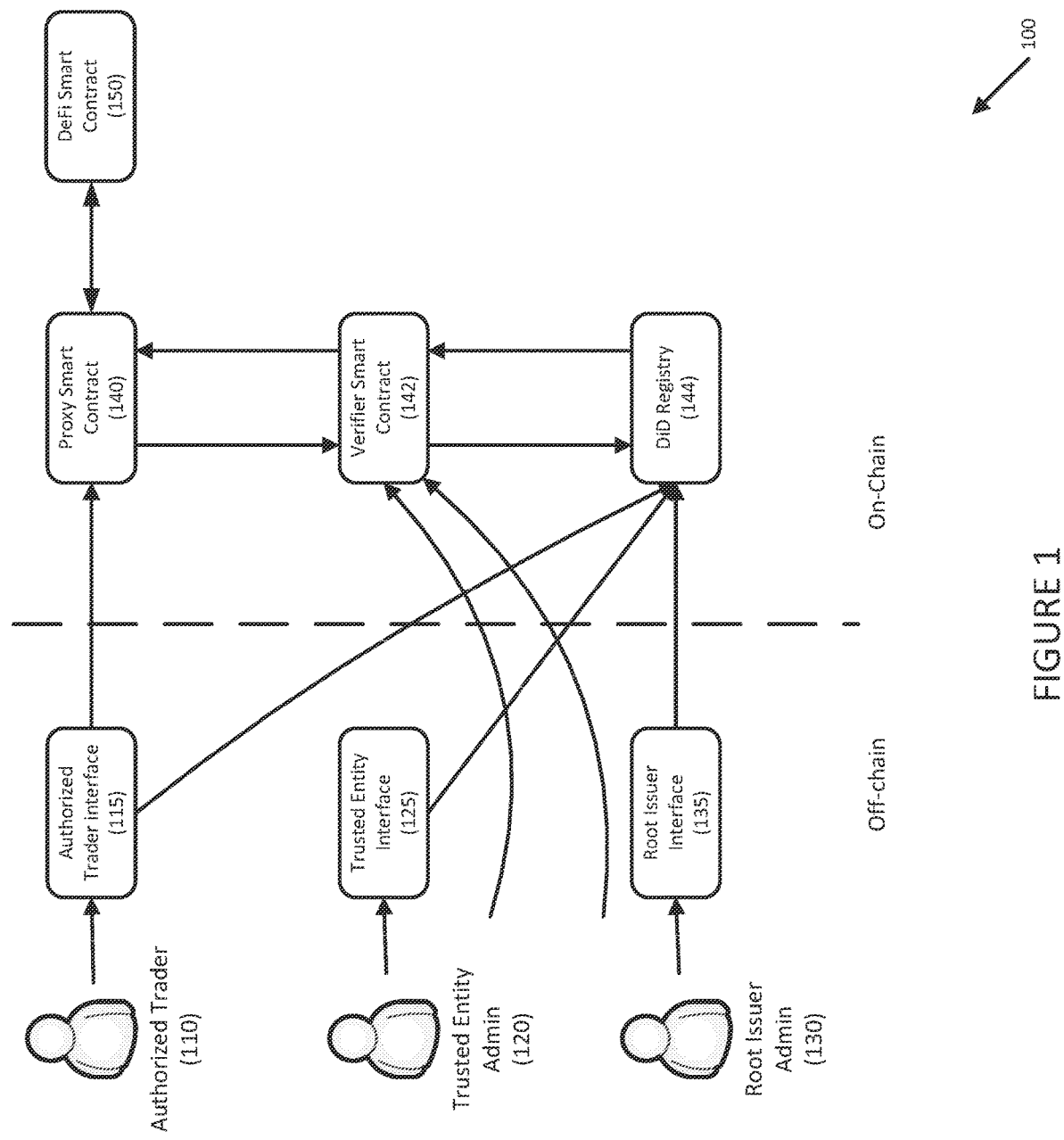
FIG. 1 depicts a system for using digital identity frameworks and infrastructure to access and interact with decentralized applications according to an embodiment.

Referring to FIG. 1, a system for using digital identity frameworks and infrastructure to access and interact with decentralized finance applications are disclosed according to embodiments. System 100 may include authorized trader 110 that may use authorized trader interface 115, trusted entity administrator 120 that may use trusted entity interface 125, and root issuer administrator 130 that may use root issuer interface 135. Interfaces 115, 125, and 135 may be provided on any suitable electronic device, including servers (e.g., physical and/or cloud-based), computers (e.g., workstations, desktops, laptops, notebooks, tablets, etc.), smart devices (e.g., smart phones, smart watches, etc.), Internet of Things (IoT) appliances, etc. In addition, interfaces 115, 125, and 135 may be provided outside of a distributed ledger environment (i.e., off-chain).

Trusted entity administrator 120 and root issuer administrator 130 may be humans or they may be systems.

The root issuer may be a trusted entity, such as governmental or other trusted body.

Authorized trader 110, trusted entity admin 120, and root issuer admin 130 may each generate a digital identifier (DiD) and register the DiD with DiD registry 144. For example, root issuer admin 130 and trusted entity admin 120 may themselves with verifier smart contract 142 so that verifier smart contract 142 may perform checks on this information.

In the on-chain environment, system 100 may include proxy smart contract 140, verifier smart contract 142, and digital identity (DiD) registry 144. Proxy smart contract may receive, from authorized trader interface 115, trade inputs and a verifiable presentation that may include a verifiable credential for the authorized trader. The verifiable credential includes a plurality of attestations, including an attestation for the trusted entity, and a root attestation for the root issuer. The attestations may be nested, such that the root issuer attestation is nested within the trusted entity attestation, which is nested within the authorized trader attestation. This forms a chain of trust, and establishes the trusted entity's authority from the root issuer to grant the authorized trader attestation.

Governance of proxy smart contract 140 may be agreed on by all participants (e.g., authorized trader 110, trusted entity admin 120, root issuer admin 130, etc.) The participants may agree to a set of rules for proxy smart contract 140 that must be followed.

Authorized trader interface 115 may convert the verifiable credential from an off-chain format to an on-chain format. In one embodiment, certain fields of the verifiable credential may be hashed for efficiency and simplicity, such as by transforming long strings into fixed length byte arrays. For example, the on-chain field VC.id may be hashed and mapped to the on-chain field VC.id; the on-chain field VC.credentialSubject.id may be hashed and mapped to the on-chain field VC.subjectDid; the on-chain field VC.issuer.id may be hashed and mapped to the on-chain field VC.issuerDid; the on-chain field VC.expirationDate may be hashed and mapped to the on-chain field VC.expirationDate; etc. Other fields, such as the on-chain field VC.tproof.signature may be mapped directly to the on-chain field VC.proof.

The on-chain and off-chain field names are exemplary only, and other field names may be used as is necessary and/or desired.

In one embodiment, authorized trader interface 115 may include a trader wallet (not shown) that may "flatten" the nested attestations before presenting them to proxy smart contract 140.

DiD registry 144 may maintain a list of active digital identifiers (DiDs). DiD registry 144 may receive DiD for of the verifiable credentials from the trusted entity and the root issuer, and may also receive revocations of DiDs from the same.

Proxy smart contract 140 may pass the trade to DeFi wrapper contract 150 upon successful verifiable credential validation (e.g., verifier smart contract 142 and DiD registry 144 checks).

In the event that the trusted entity would like to amend the default smart contract to include bespoke annual percentage yields (APYs) (or other bespoke requirements), the institution would need to interact with separate wrapper DeFi smart contracts in addition to the primary smart contract.

Figure 2A:
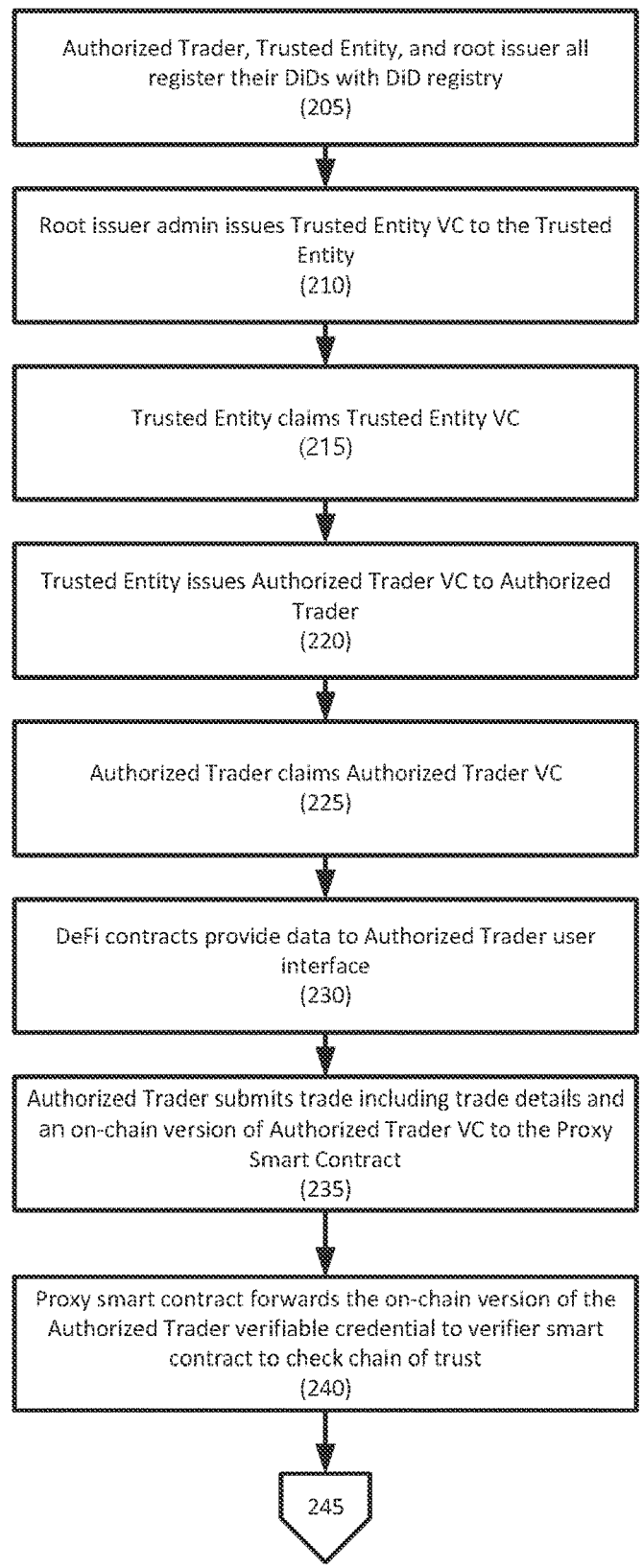
FIGS. 2A and 2B depict a method for using digital identity frameworks and infrastructure to access and interact with decentralized applications according to an embodiment.
Figure 2B:
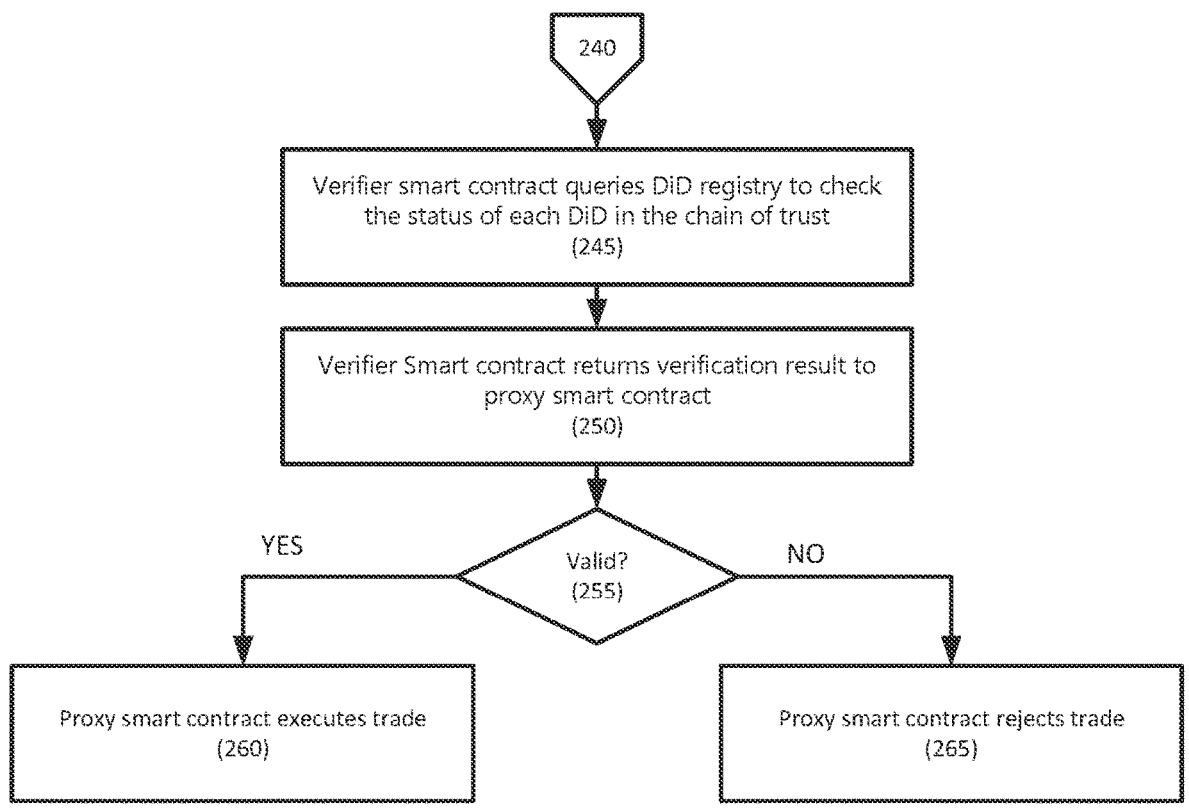

Referring to FIGS. 2A and 2B, a method for using digital identity frameworks and infrastructure to access and interact with decentralized applications according to an embodiment.

In step 205, an authorized trader, a trusted entity administrator, and a root issuer administrator may each generate respective DiDs and register the DiDs with the DiD registry.

In one embodiment, the authorized trader, trusted entity, and root issuers may interface with the DiD registry using their respective interfaces.

In embodiments, only individual stakeholders with "relevant credentials" may interact with/connect to their entities' proxy smart contract via their own wallets.

In embodiments, stakeholders, such as risk managers, may be added. These stakeholders may issue credentials (e.g., Risk parameter credentials) to each authorized trader. This credential may dictate the limits each authorized trader has, and the tokens/assets they can interact with, etc.

In step 210, the root issuer administrator may issue a trusted entity verifiable credential to the trusted entity. For example, the root issuer administrator may issue the trusted entity verified credential to the trusted entity using, for example, an issuance service. For example, the root issuer administrator may set a root issuer identity with a verifier smart contract. The root issuer may be a trusted entity, such as governmental or other trusted body, and may issue its verifiable credential to the verifier smart contract.

In one embodiment, the root issuer administrator may add entitlements (e.g., data attributed to the subject of the verifiable credential, such as the claims or attested points). For example, a claim may attest to a type of business for the trusted entity.

In step 215, the trusted entity may claim the trusted entity verifiable credential. This may include the creation of the trusted entity verifiable credential from the entitlement data and registering the trusted entity verifiable credential DiD with the DiD registry.

For example, the trusted entity administrator may use the trusted entity interface to claim the trusted entity verifiable credential and to issue authorized trader verifiable credentials to authorized traders.

In one embodiment, the trusted entity verified credential may be saved in a wallet for the trusted entity.

In step 220, the trusted entity administrator may issue a trusted authorized trader verifiable credential to the authorized trader. For example, the trusted entity admin may issue an authorized trader verified credential to its trader employees using, for example, an issuance service. Additional users, such as risk managers and authorized credential issuers, may sign into an issuance service user interface to manage and issue credentials as well as determine rules in the identity smart contract.

In one embodiment, the trusted entity administrator may add entitlements (e.g., subject data) for the authorized traders. For example, a claim may attest to an authorized trade limit of a certain amount) for the trusted entity.

In one embodiment, the trusted entity administrator may issue the authorized trader verifiable credential using, for example, a one-time passcode, out of band authentication, etc. to verify the authorized traders. The authorized trader verifiable credential status may be recorded using a verifier smart contract.

In step 225, the authorized trader may claim the authorized trader verifiable credential. This may include the creation of the authorized trader verifiable credential from the entitlement data and registering the authorized trader verifiable credential DiD with the DiD registry. This may be similar to step 215, above.

In step 230, one or more DeFi contracts may provide trade information to the authorized trader user interface. For example, the one or more DeFi contracts may provide the authorized trader user interface with the current annual percentage yields (APYs), tokens that exist in the DeFi pool (e.g., tokens for real world assets, cryptocurrency, deposits, etc.), collateral, balances, etc. For example, the DeFi contracts may identify the contracts that have been deposited into the DeFi pool from reading the distributed ledger. Oracles may be used to retrieve certain information, such as pricing, variable APYs, etc.

In step 235, an authorized trader may submit a trade including trade details and an on-chain format of the authorized trader verifiable credential to the proxy smart contract The authorized trader may submit the trade using the authorized trader user interface.

In one embodiment, the authorized trader user interface or an authorized trader wallet may convert the authorized trader verifiable credential to an on-chain format.

In step 240, the proxy smart contract may forward the on-chain format of the authorized trader verifiable credential to the verifier smart contract to check chain of trust.

In step 245, the verifier smart contract may query the DiD registry to check the status of each DiD in the chain of trust for the authorized trader verifiable credential. The verifier smart contract may check the status of the DiDs associated with the authorized trader verifiable credential. For example, the verifier smart contract may identify the DiDs for the authorized trader verifiable credential and may verify that the DiDs have not been revoked, suspended, etc.

In step 250, the verifier smart contract returns a verification result to the proxy smart contract. If, in step 255, the responses are valid (e.g., the trade complies with the rules and the DiDs have not been revoked or suspended), in step 260, the proxy smart contract may execute the trade.

For example, after successful verification, the specified number of tokenized securities may be "unlocked" and sent to the DeFi smart contracts per the instructions of the authorized trader.

Alternatively, after successful verification, the authorized trader can call back (e.g., redeem tokens) from DeFi smart contracts to the proxy smart contract.

In one embodiment, the DeFi smart contracts may only interact with securities contract and may not receive the authorized trader's credentials.

If not, in step 265, the proxy smart contract may reject the trade.

Embodiments may provide scalability. For example, embodiments may facilitate the addition of new stakeholders, such as risk officers. These stakeholders may issue credentials (e.g., Risk parameter credentials) to each authorized trader. This credential type may dictate the limits each authorized trader has, and the tokens/assets they can interact with, etc. The stakeholders may determine the risk limits and include such risk limits in a blob of data within the credential.

FIG. 3 depicts exemplary details for converting a verifiable credential from an off-chain format to an on-chain format. For example, the off-chain verifiable credential format is a structure that is converted to the on-chain verifiable credential format structure. An example function for converting from the off-chain format to the on-chain format is as follows:

```
@context: removed
VC2.id = hash(VC1.id)
VC2.credentialSubject = {
id: hash(VC1.credentialSubject.id),
data: hash(VC1.credentialSubject claims) //data was empty because no claims
}
```

Other functions may be used as is necessary and/or desired.

In one embodiment, a nested verifiable credential may be flattened into an array according to an embodiment. An original verifiable credential (e.g., the off-chain verifiable credential may represent the chain of trust by nesting verifiable credentials in its issuer.vc field. So, for example, the authorized trader verifiable credential includes three verifiable credentials. Because sending the verifiable credential in this way would be computationally difficult, embodiments may instead "flatten" the verifiable credential and present it as an array or a list of three verifiable credential after each goes through the conversion process described above. The authorized trader verifiable credential may be first in the list, with the trusted entity verifiable credential next, and the root issuer verifiable credential last. Using this positioning, the verified smart contract may address the verifiable credentials in this order.

To send the array of verifiable credentials on-chain, the verifiable credentials may be wrapped in an OnChainVerifiablePresentation structure. For example, the following code snippet may be used:

```
export interface OnChainCredentialSubject {
    id: string,
    data: string
}
export interface OnChainProof {
    types: string,
    verificationMethod: string,
    proofValue: string
}
export interface OnChainPresentationProof {
    types: string,
    verificationMethod: string,
    proofValue: string,
    nonce: number
}
export interface OnChainVerifiableCredential {
    id: string,
    credentialSubject: OnChainCredentialSubject,
    issuer: string,
    expirationDate: number,
    issuanceDate: number,
    types: string,
    proof: OnChainProof,
}
export interface OnChainVerifiablePresentation {
    id: string,
    verifiableCredential: OnChainVerifiableCredential[ ],
    proof: OnChainPresentationProof
}
```

Figure 4:
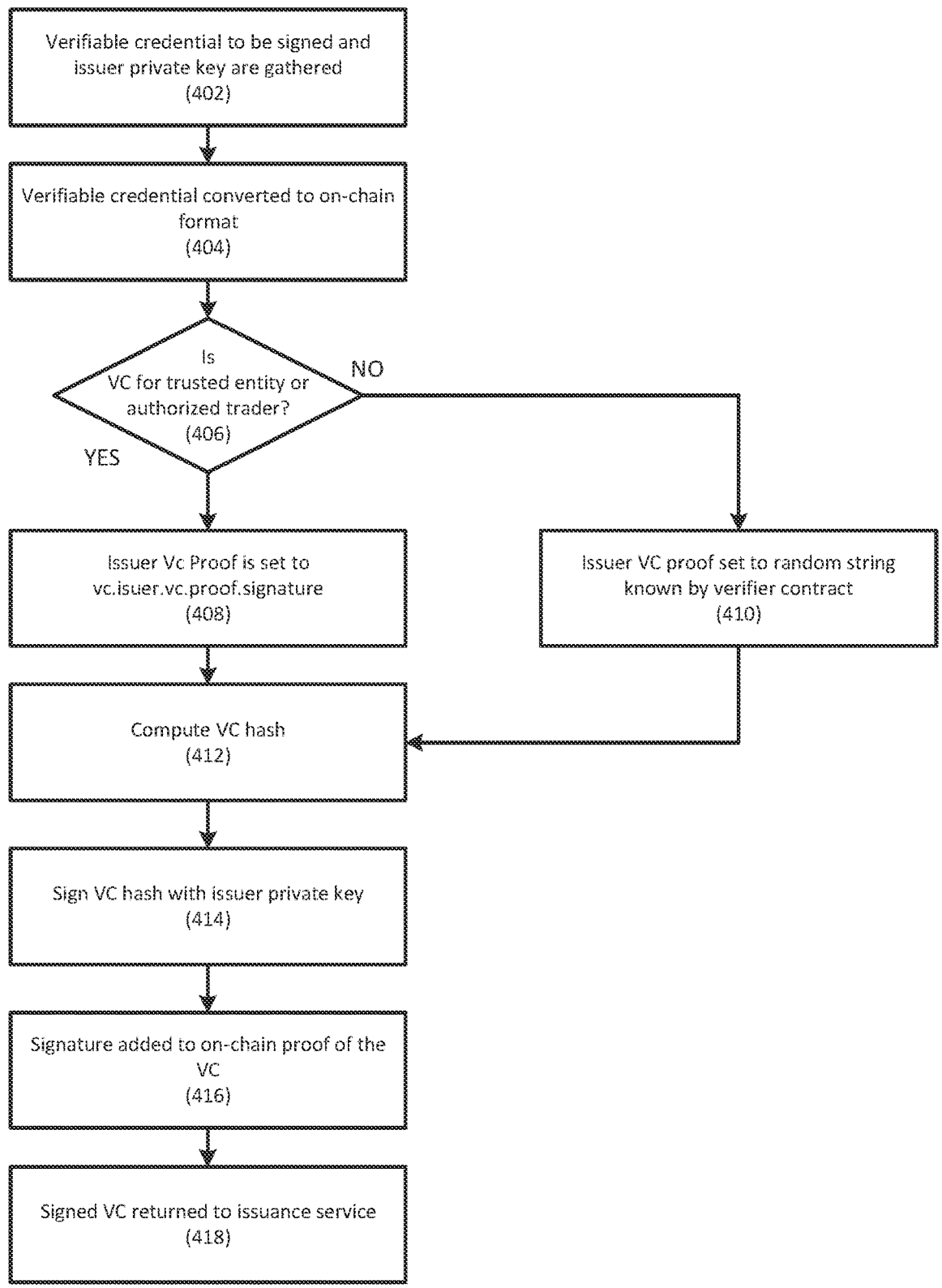
FIG. 4 depicts an exemplary method of issuer proof generation according to an embodiment.

FIG. 4 depicts an example of a method of issuer proof generation according to an embodiment. This process describes how the on-chain proof is created from the verifiable credential being issued. This may be used by the Issuance Service when it issues a verifiable credential, and may occur for the Root verifiable credential, the Trusted Entity verifiable credential, and the Authorized trader verifiable credential. The issued verifiable credential needs to have an on-chain proof within it so that the verifier smart contract can validate the verifiable credential.

In one embodiment, the proof that is generated may be an embedded proof. For example, the verifiable credential may be a JSON Web Token (JWT) that includes all the needed metadata, the subject, and claims per standards. Other accepted standards which can also be used are JSON and JSON-LD.

In step 402, inputs may be gathered, such as the verifiable credential to be signed and the issuer private key.

In step 404, the format of the verifiable credential may be converted using from the off-chain format to the on-chain format.

In step 406, a check is made to see if the verifiable credential is either the Trusted Entity verifiable credential or the Authorized Trader verifiable credential. If it is, in step 408, the issuer verifiable credential proof (e.g., issuerVcProof, which is the proof for the verifiable credential at the level above in the chain of trust is set. For example, if the current verifiable credential is the authorized trader verifiable credential, the issuerVCProof is the Trusted Entity's verifiable credential proof. If the current verifiable credential is the Trusted Entity verifiable credential, the issuerVCProof is the Root's verifiable credential proof. Essentially it's the proof of the VC at the level above in the chain of trust.

The issuer verifiable credential proof may be recursive (i.e., the issuer's on-chain proof is included in the subject verifiable credential on-chain proof to provide a cryptographic link between the issuer and subject verifiable credential).

In it is not, meaning that the verifiable credential is the root verifiable credential, in step 410, the issuer verifiable credential proof may be set to a random string known by the verifier contract.

In step 412, a verifiable credential hash may be computed. This may be a hash of the converted verifiable credential inputs and the issuer verifiable credential proof that will be signed by the issuer private keys.

In step 414, the verifiable credential hash may be signed with the issuer private key.

In step 416, the new signature is added to the on-chain proof of the verifiable credential.

In step 418, the signed verifiable credential may be returned to the issuance service.

Figure 5:
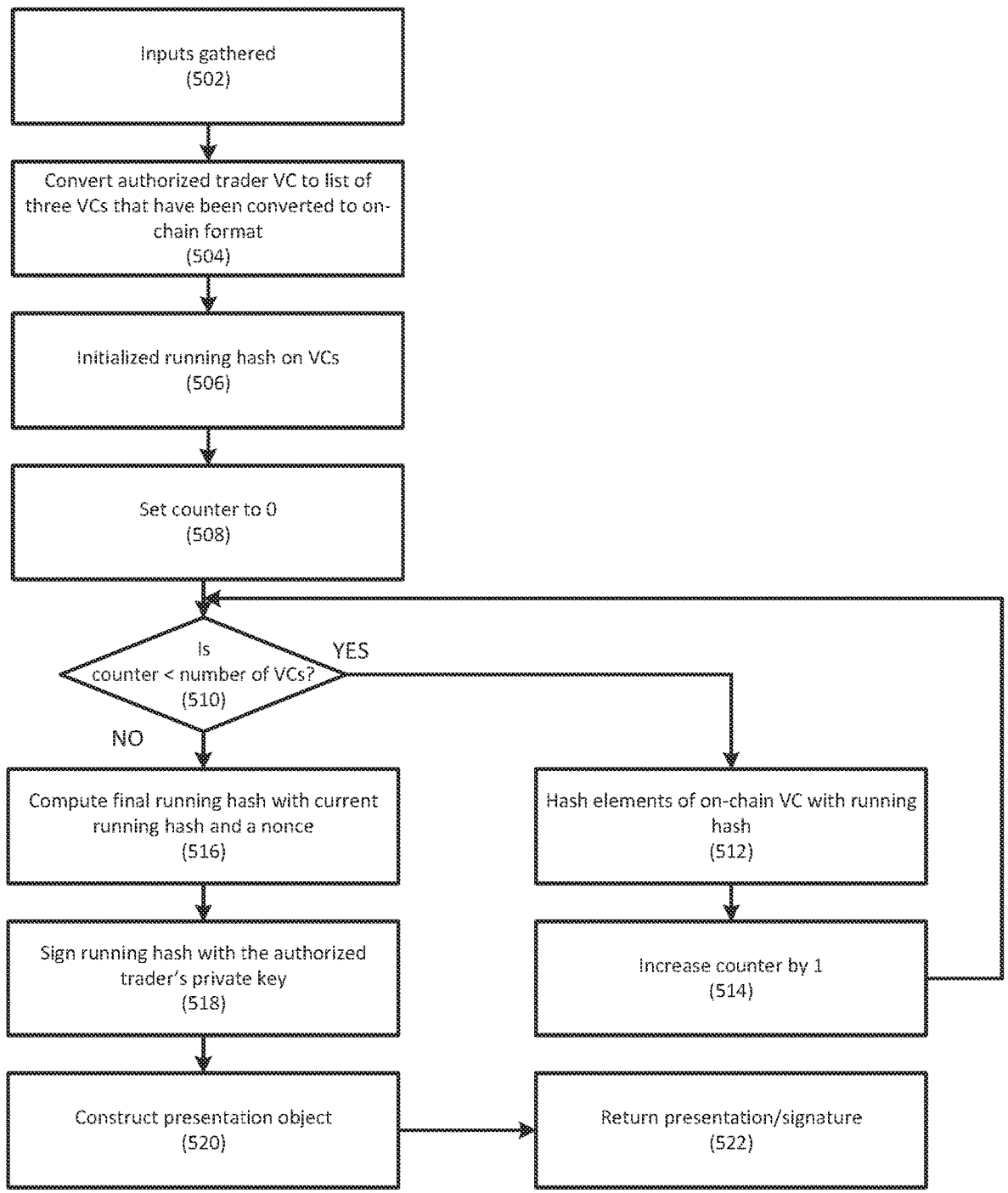
FIG. 5 depicts an exemplary method of generating a presentation proof according to an embodiment.

FIG. 5 depicts an example of a method of generating a presentation proof according to an embodiment. This describes the process of how the wallet creates the presentation that is sent on-chain.

In step 502, inputs may be gathered, such as the verifiable credential, a nonce, and the authorized trader's private key.

In step 504, given an Authorized Trader verifiable credential, the chain of trust may be converted into a list of three verifiable credentials that have been converted to the on-chain format.

In step 506, a running hash of the verifiable credentials may be initiated.

The process may loop through all three verifiable credentials in the chain of trust. Thus, in step 508, a counter is set to 0. If, in step 510, the counter is less than the number of verifiable credentials (i.e., 3), in step 512, since the root verifiable credential has not been reached, the elements of the current on-chain verifiable credential may be hashed with the running hash.

In step 514, the counter is incremented by 1 and the process returns to step 510.

If the counter is not less than 3, meaning that the root verifiable credential is being evaluated, in step 516, the final running hash with the current running hash and a nonce (which may be derived from the authorized trader's DiD) may be computed.

In step 518, the running hash may be signed with the authorized trader's private key, which functions as the proof of the verifiable presentation.

In step 520, a presentation object may be constructed. The presentation object may include the on-chain verifiable credential and the proof of the verifiable presentation.

In step 522, the presentation object may be returned to the wallet so it can be presented on-chain with the trade details.

Figure 6A:
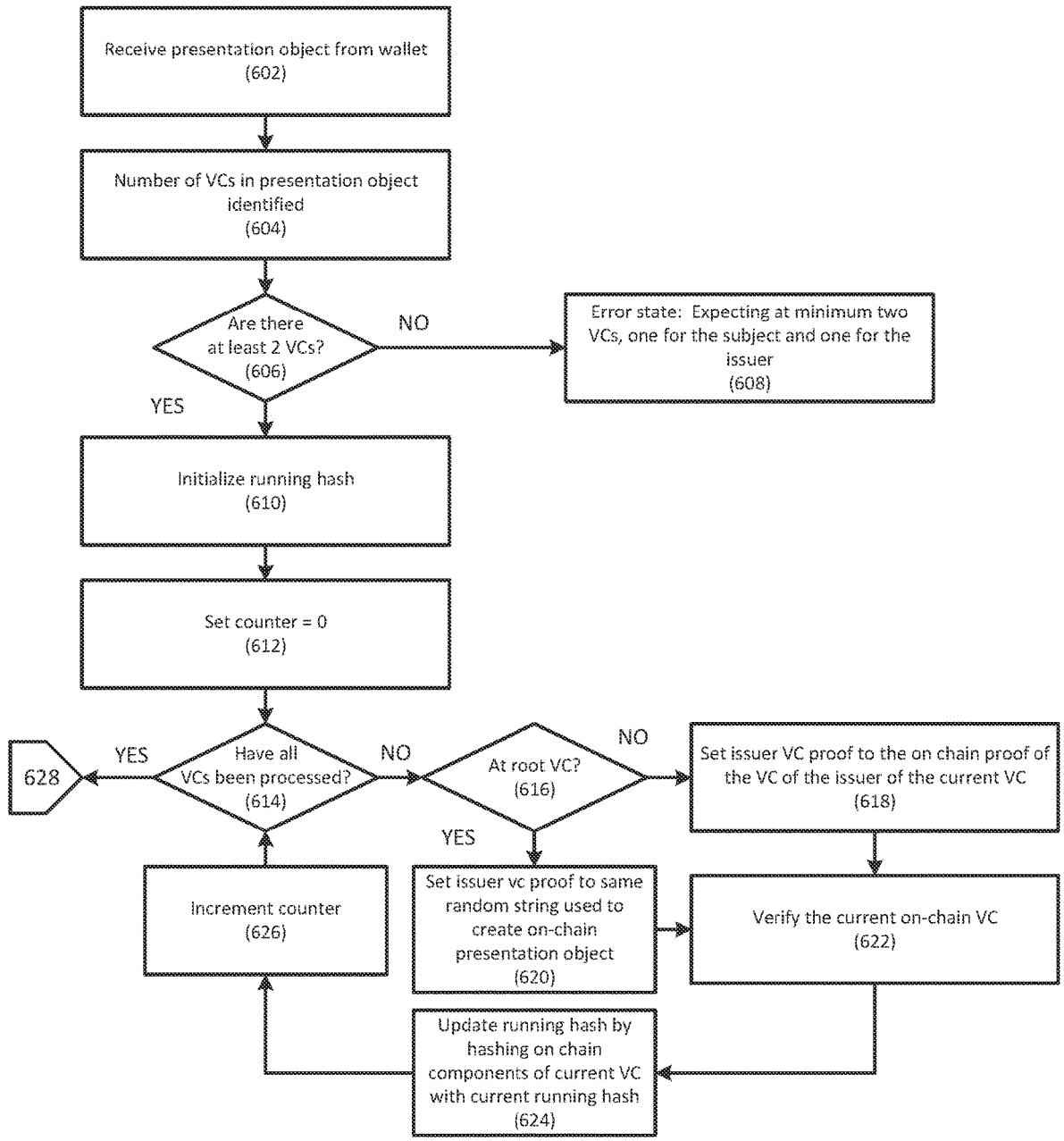
FIGS. 6A and 6B depict an exemplary method of verifying smart contract function according to an embodiment.
Figure 6B:
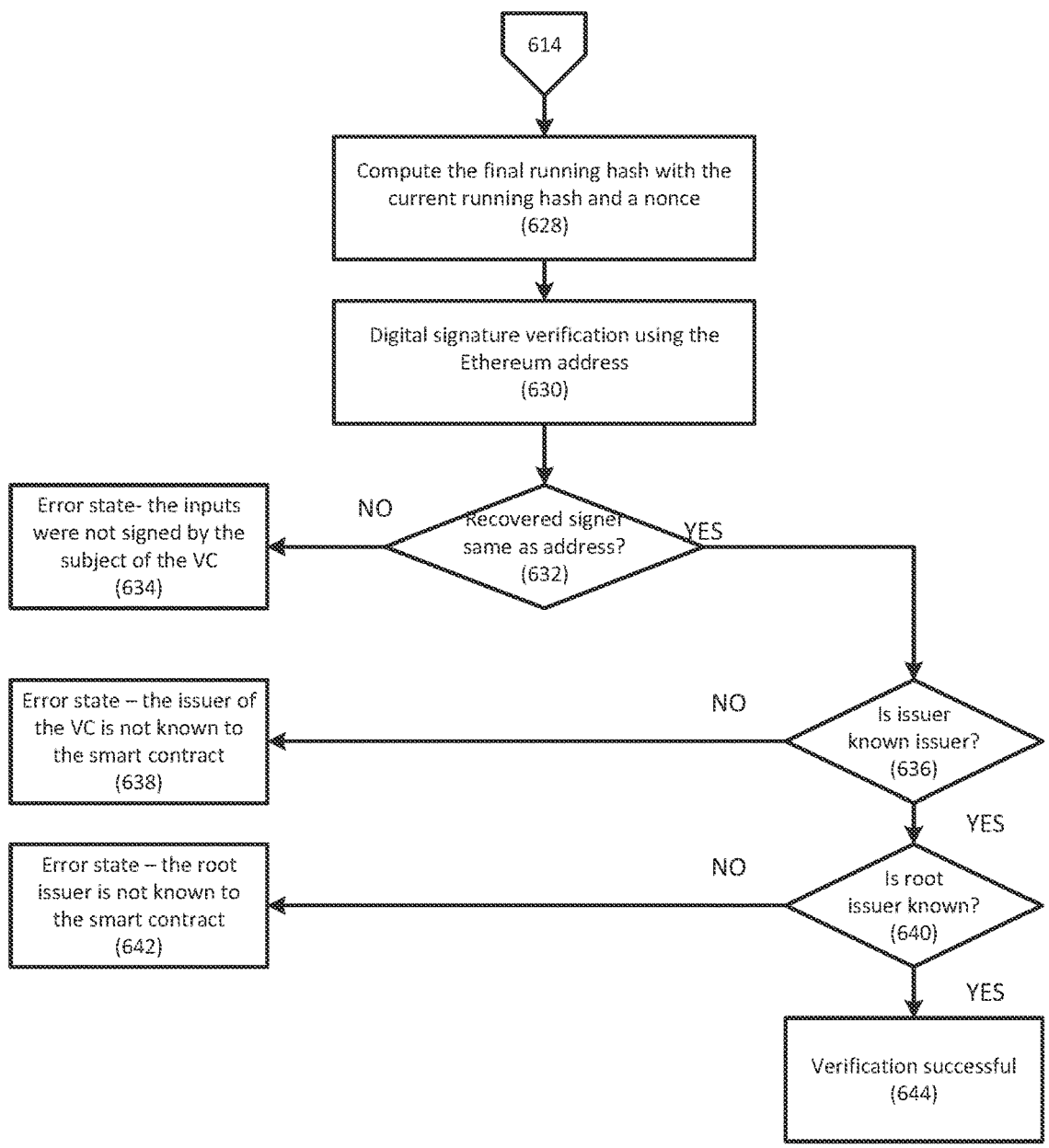

FIGS. 6A and 6B depict an example of a method of verifying a smart contract function according to an embodiment. This describes the logic that the verifier smart contract may apply to verify the presentation object that is shared from a wallet.

In embodiments, the verifier smart contract function may: (1) verify a nested VC; (2) ensure that the inputs to the function are signed by the credential holder (e.g., the subject); (3) ensure that the chain of trust is valid by checking if the verifiable credential issuer and the root issuer are correct as per the verifier's acceptance criteria; and/or (4) implementing any business logic as is necessary and/or desired.

In step 602, the verifier smart contract may receive the presentation object from a wallet of a subject, such as an authorized trader.

In step 604, the number of verifiable credentials in the presentation object may be identified.

In step 606, if the number of VCs is not at least two, in step 608 there may be an error state as the verifier smart contract expects, at a minimum, two VCs, with one for the subject and one for the issuer.

In step 610, the verifier smart contract may initiate a running hash with the received VCs.

In step 612, a counter may be set to 0. If, in step 614, all VCs have not been processed, in step 616, a check is made to see if the root verifiable credential is being evaluated. If it is not, in step 618, the issuer verifiable credential proof may be set to the on-chain proof of the verifiable credential of the issuer of the current verifiable credential. If the root verifiable credential is being evaluated, in step 620, the issuer verifiable credential proof may be set to the same random string used to create the on-chain presentation object.

In step 622, the current on-chain verifiable credential may be evaluated. For example, the inputs may be the on-chain verifiable credential and the on-chain proof from this VCs issuer. The issuer's on-chain proof is needed in order to construct the verifiable credential s hash. Including the issuer's proof value preserves that cryptographic link between verifiable credential and its Issuer.

This will throw an error internally if individual verifiable credential verification fails.

In step 624, the running hash may be updated by hashing on-chain components of current verifiable credential VC with the current running hash.

In step 626 the counter is incremented, and in the process moves to the next verifiable credential in the list.

If, in step 614, all verifiable credentials have been processed, in step 628, the final running hash of the presentation is computed from the current running hash and a nonce derived from the subject's DiD. This should match the one that the subject's wallet created and signed as the signature of the presentation.

In step 630, the digital signature may be verified using the Ethereum address. Given the running hash and the presentation signature, the Ethereum address responsible for signing the input (e.g., the running hash) may be recovered.

In step 632, a check is made to see if the recovered signer is the same as the address of the subject. If it is not, in step 634, there is an error state as the inputs were not signed by the subject of the verifiable credential.

In step 636, a check is made to see if the issuer in the presentation object is a known issuer. If it is not, in step 638, there is an error state as the issuer of the verifiable credential is not known to the smart contract.

In step 640, a check is made to see if the root issuer in the presentation object is a known root issuer. If it is not, in step 642, there is an error state as the root issuer is not known to the smart contract.

In step 644, if all checks pass, the verification is successful.

Figure 7A:
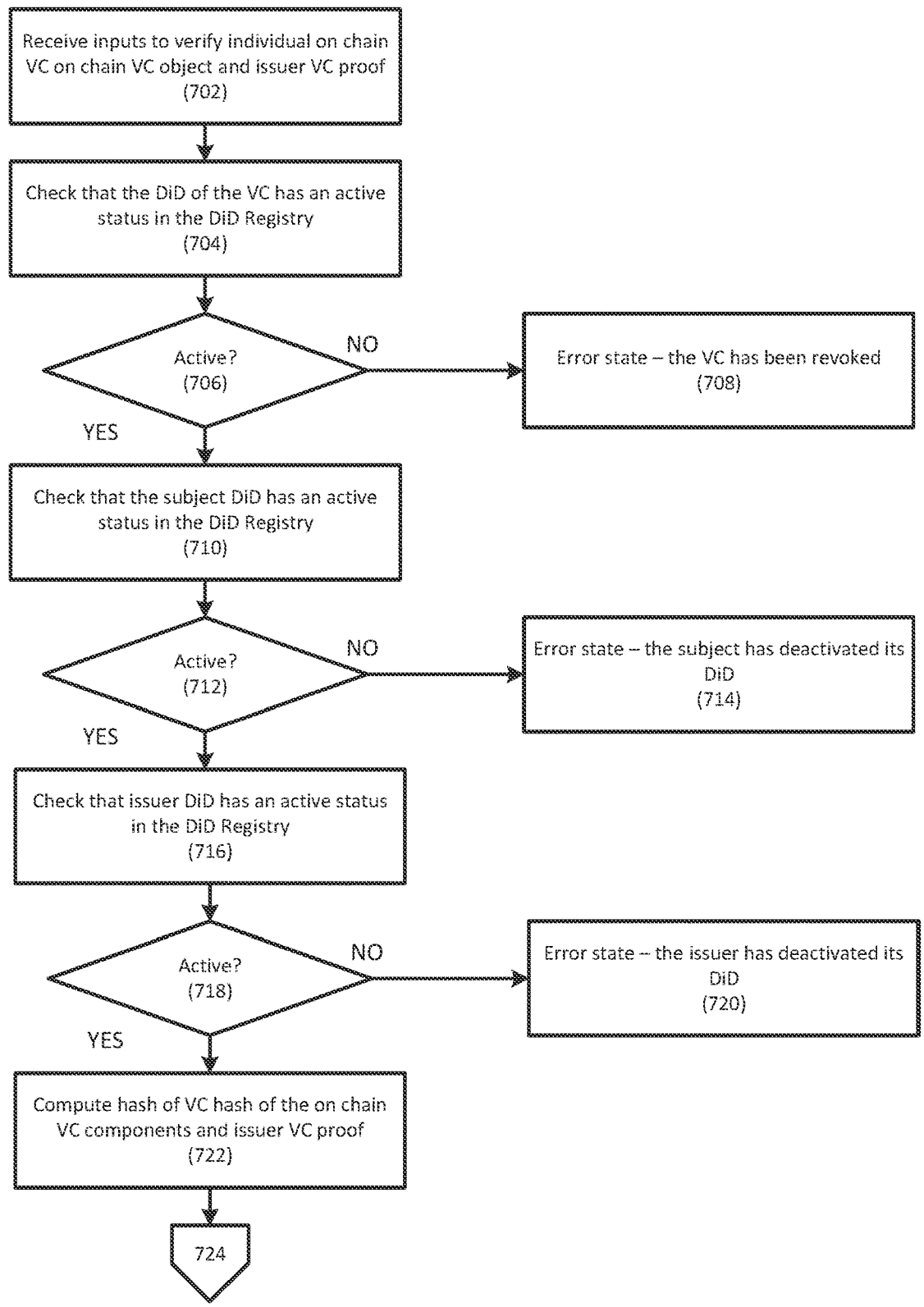
FIGS. 7A and 7B depict an exemplary method of verifying a verifiable credential according to an embodiment.
Figure 7B:
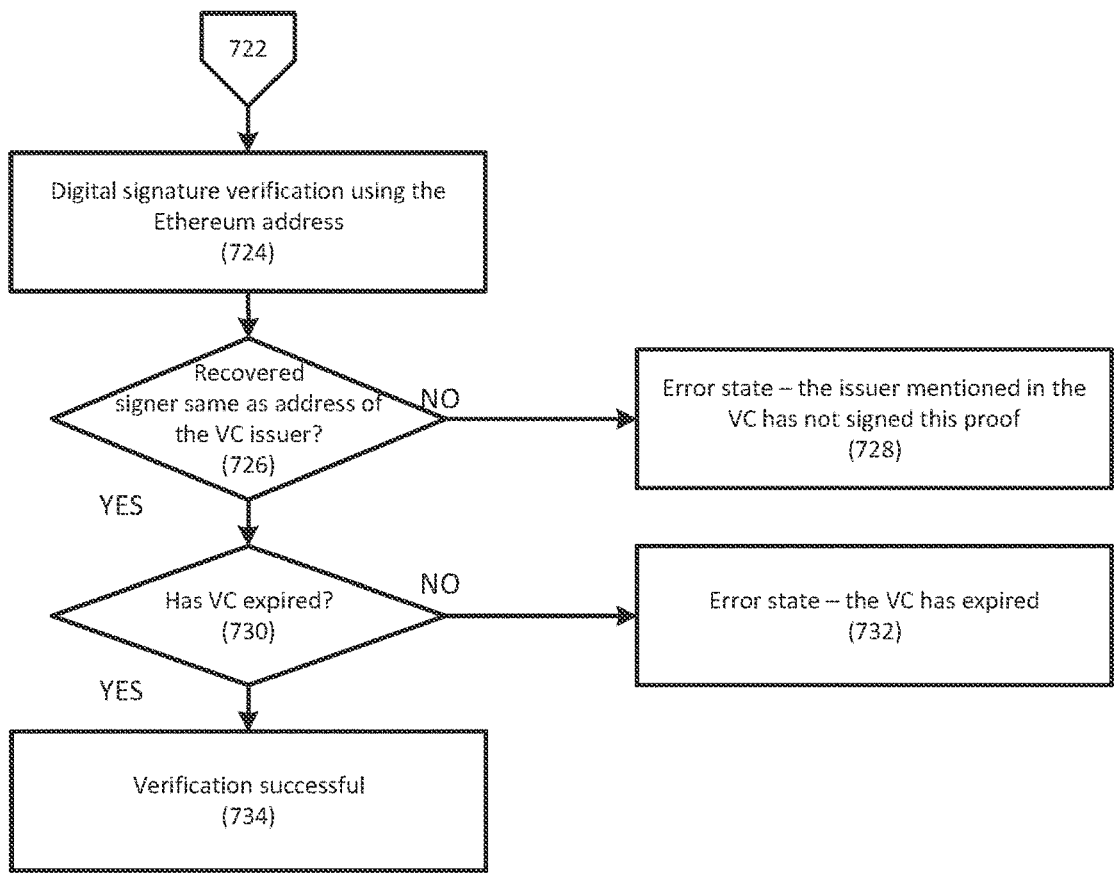

FIGS. 7A and 7B depict an exemplary method of verifying a verifiable credential according to an embodiment. This describes the verify credential logic used by the verifier smart contract. It may: (1) verify an individual verifiable credential; (2) ensure that the contents of the verifiable credential are signed by the issuer; (3) ensure that the relevant DiDs are active; and/or (4) ensure that the verifiable credential has not expired.

In step 702, verification inputs, such as on-chain verifiable credential object and the issuer verifiable credential proof, may be received.

In step 704, the verifier smart contract may check that the DiD of the verifiable credential has an active status in the DiD Registry. If, in step 706, the DiD does not have an active status, in step 708, there is an error state as the verifiable credential has been revoked.

In step 710, the verifier smart contract may check that the subject (e.g., the authorized trader) DiD has an active status in the DiD Registry. If, in step 712, it does not, in step 714, there is an error state as the subject has deactivated its DiD.

In step 716, the verifier smart contract may check that the issuer (e.g., the trusted entity) DiD has an active status in the DiD Registry. If, in step 718, it does not have an active status, in step 720, there is an error state as the issuer has deactivated its DiD.

If all checks pass, in step 722, the verifier smart contract may compute a verifiable credential hash of the on-chain verifiable credential components and the issuer verifiable credential proof.

In step 724, the digital signature may be verified using the Ethereum address. Given the running hash and the presentation signature, the Ethereum address responsible for signing the input (e.g., the running hash) may be recovered.

In step 726, a check is made to see if the recovered signer is the same as the address of the verifiable credential issuer. If it is not, in step 728, there is an error state as the issuer in the verifiable credential has not signed this proof.

In step 730, a check is made to see if the verifiable credential has expired. If it has, in step 732, there is an error state as the verifiable credential has expired.

If not, in step 734, the verification is successful.

Figure 8:
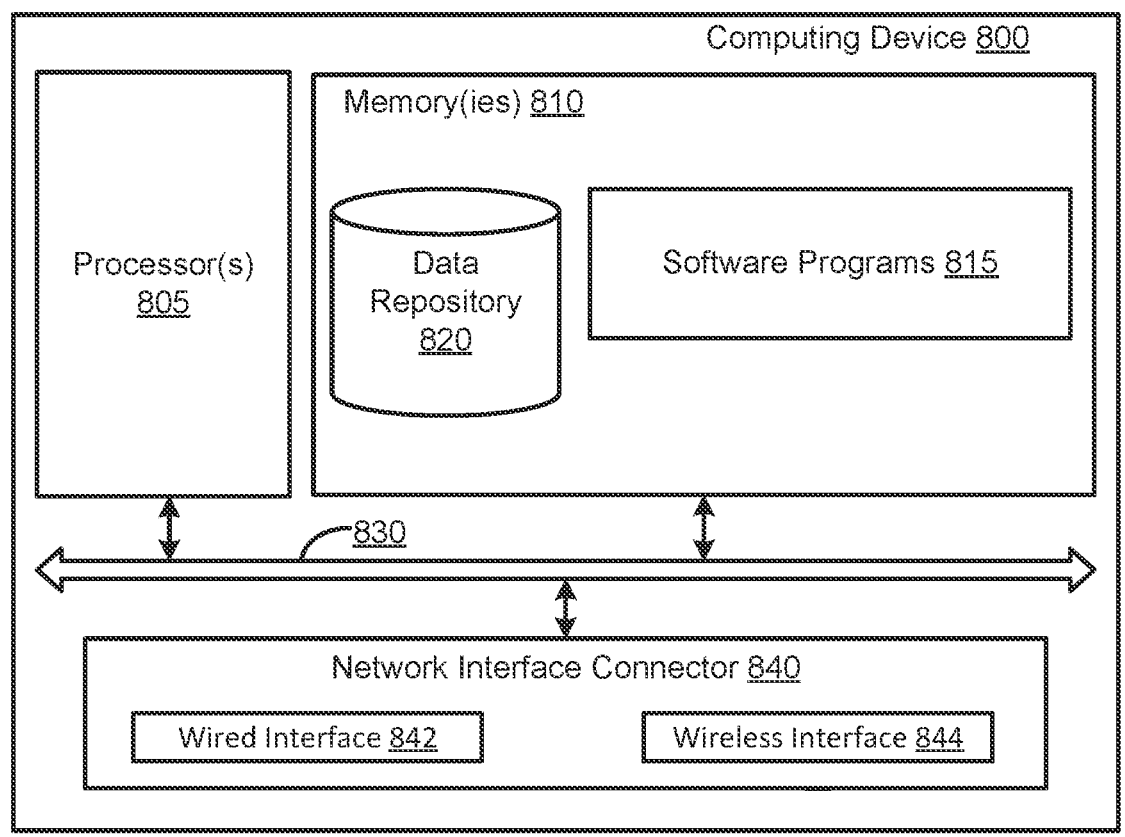
FIG. 8 depicts an exemplary computing system for implementing aspects of the present disclosure.

FIG. 8 depicts an exemplary computing system for implementing aspects of the present disclosure. FIG. 8 depicts exemplary computing device 800. Computing device 800 may represent the system components described herein. Computing device 800 may include processor 805 that may be coupled to memory 810. Memory 810 may include volatile memory. Processor 805 may execute computer-executable program code stored in memory 810, such as software programs 815. Software programs 815 may include one or more of the logical steps disclosed herein as a programmatic instruction, which may be executed by processor 805. Memory 810 may also include data repository 820, which may be nonvolatile memory for data persistence. Processor 805 and memory 810 may be coupled by bus 830. Bus 830 may also be coupled to one or more network interface connectors 840, such as wired network interface 842 or wireless network interface 844. Computing device 800 may also have user interface components, such as a screen for displaying graphical user interfaces and receiving input from the user, a mouse, a keyboard and/or other input/output components (not shown).

The disclosures of U.S. Provisional Patent Application Ser. No. 63/126,335, filed Dec. 16, 2020, U.S. Provisional Patent Application Ser. No. 62/976,262, filed Feb. 13, 2020, and U.S. patent application Ser. No. 17/174,650, filed Feb. 12, 2021, are hereby incorporated, by reference, in their entireties.

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for using digital identity frameworks and infrastructure to access and interact with decentralized applications, comprising:
   receiving, by a proxy smart contract, a trade from an authorized trader and an on-chain format of a verifiable credential, wherein the on-chain format of the verifiable credential comprises a flattened array of an authorized trader verifiable credential, a trusted entity verifiable credential, and root issuer verifiable credential;
   verifying, by the proxy smart contract and using a verifier smart contract, the on-chain format of the verifiable credential, wherein the verifier smart contract queries a digital identifier registry to verify that an authorized trader digital identifier associated with the authorized trader verifiable credential, a trusted entity digital identifier associated with the trusted entity verifiable credential, and a root issuer digital identifier associated with the root issuer verifiable credential are active; and
   in response to the authorized trader digital identifier, the trusted entity digital identifier, and root issuer digital identifier being active, executing, by the proxy smart contract and with a decentralized finance smart contract, the trade.

2. The method of claim 1, wherein the authorized trader digital identifier, the trusted entity digital identifier, and root issuer digital identifier are registered in the digital identifier registry.

3. The method of claim 1, wherein the authorized trader verifiable credential, the trusted entity verifiable credential, and the root issuer verifiable credential are nested in an off-chain format of the verifiable credential.

4. The method of claim 3, wherein a wallet for the authorized trader coverts the off-chain format of the verifiable credential into the on-chain format of the verifiable credential.

5. The method of claim 1, wherein the trusted entity verifiable credential is issued by a root issuer.

6. The method of claim 1, wherein the authorized trader verifiable credential is issued by a trusted entity issuer.

7. The method of claim 1, further comprising:
   receiving, by the proxy smart contract, verification that the trade complies with one or more rules.

8. The method of claim 1, wherein the verifier smart contract is configured to confirm that a trusted entity and a root issuer are known.

9. The method of claim 1, wherein the verifier smart contract is configured to verify a digital signature for a proof using an Ethereum address private key for a signer.

10. A method of preparing an on-chain verifiable credential, comprising:
    claiming, by an authorized trader user interface, an authorized trader verifiable credential from a trusted entity, wherein the authorized trader verifiable credential comprises a trusted entity verifiable credential for the trusted entity and a root issuer verifiable credential for a root issuer, wherein the root issuer verifiable credential and the trusted entity verifiable credential are nested within the authorized trader verifiable credential;
    registering, by the authorized trader user interface, an authorized trader digital identifier with a digital identifier registry;
    converting, by the authorized trader user interface, the authorized trader verifiable credential from an off-chain format to an on-chain format, wherein the on-chain format comprises a flattened array of the authorized trader verifiable credential, the trusted entity verifiable credential, and the root issuer verifiable credential; and
    submitting, by the authorized trader user interface, a trade and the on-chain format of the authorized trader verifiable credential to a proxy smart contract;
    wherein the proxy smart contract is configured to forward the on-chain format of the authorized trader verifiable credential to a verifier smart contract, and the verifier smart contract is configured to query a digital identifier registry to verify that an authorized trader digital identifier associated with the authorized trader verifiable credential, a trusted entity digital identifier associated with the trusted entity verifiable credential, and a root issuer digital identifier associated with the root issuer verifiable credential are active, and in response to the authorized trader digital identifier, the trusted entity digital identifier, and root issuer digital identifier being active, execute the trade with a decentralized finance smart contract.

11. The method of claim 10, wherein the trusted entity verifiable credential is issued by a root issuer.

12. The method of claim 10, wherein the authorized trader verifiable credential is issued by a trusted entity issuer.

13. The method of claim 10, wherein the authorized trader digital identifier, the trusted entity digital identifier, and root issuer digital identifier are registered in the digital identifier registry.

14. A system, comprising:
    an authorized trader interface for an authorized trader;
    a trusted entity interface for a trusted entity;
    a root issuer interface for a root issuer;
    a proxy smart contract in communication with the authorized trader interface and a decentralized finance smart contract;
    a verifier smart contract in communication with the proxy smart contract;
    a digital identifier registry; and
    a decentralized finance smart contract;
    wherein:
    the root issuer interface registers a root issuer digital identifier with the digital identifier registry;
    the root issuer interface issues a trusted entity verifiable credential to the trusted entity, wherein the trusted entity verifiable credential comprises a root issuer verifiable credential;

the trusted entity claims the trusted entity verifiable credential and registers a trusted digital identifier with the digital identifier registry;

the trusted entity interface issues an authorized trader verifiable credential to the authorized trader, wherein the authorized trader verifiable credential comprises the trusted entity verifiable credential and the root issuer verifiable credential, wherein the trusted entity verifiable credential and the root issuer verifiable credential are nested in the authorized trader verifiable credential;

the authorized trader claims the authorized trader verifiable credential and registers an authorized trader digital identifier with the digital identifier registry;

the authorized trader interface converts the authorized trader verifiable credential from an off-chain format to an on-chain format, wherein the on-chain format comprises a flattened array of the authorized trader verifiable credential, the trusted entity verifiable credential, and the root issuer verifiable credential;

the authorized trader interface communicates a trade and the on-chain format of the authorized trader verifiable credential to the proxy smart contract;

the proxy smart contract communicates the trade and the on-chain format of the authorized trader verifiable credential to the verifier smart contract;

the verifier smart contract queries the digital identifier registry to verify that an authorized trader digital identifier associated with the authorized trader verifiable credential, a trusted entity digital identifier associated with the trusted entity verifiable credential, and a root issuer digital identifier associated with the root issuer verifiable credential are active; and in response to the authorized trader digital identifier, the trusted entity digital identifier, and root issuer digital identifier being active, the proxy smart contract executes the trade with the decentralized finance smart contract.

15. The system of claim 14, wherein the proxy smart contract receives verification that the trade complies with one or more rules.

16. The method of claim 1, wherein the verifier smart contract is confirms that the trusted entity and the root issuer are known.

17. The method of claim 1, wherein the verifier smart contract is verifies a digital signature for a proof using an Ethereum address private key for a signer.

18. The method of claim 1, wherein the proxy smart contract receives trade information for the trade.

* * * * *